United States Patent [19]

Huddleston et al.

[11] Patent Number: 4,855,922

[45] Date of Patent: Aug. 8, 1989

[54] APPARATUS AND METHOD FOR MONITORING AN ENERGY MANAGEMENT SYSTEM

[75] Inventors: Paul M. Huddleston, Stone Mountain; G. Burns Porter, Jr., Doraville; David T. Rooney, Marietta, all of Ga.

[73] Assignee: Scientific-Atlanta, Inc., Atlanta, Ga.

[21] Appl. No.: 28,618

[22] Filed: Mar. 20, 1987

[51] Int. Cl.⁴ .......................... G06F 15/20; H02J 1/00
[52] U.S. Cl. ............................... 364/464.04; 364/493; 307/38
[58] Field of Search ............... 364/492, 493, 464, 551, 364/483; 73/112; 307/35, 38, 39; 340/637, 661, 687

[56] References Cited

U.S. PATENT DOCUMENTS

| | | |
|---|---|---|
| 3,469,082 | 9/1969 | Thompson et al. ............... 364/493 |
| 3,683,161 | 8/1972 | Stadlin et al. ................... 364/493 |
| 3,719,809 | 3/1973 | Fink ............................... 364/493 |
| 4,023,043 | 5/1977 | Stevenson ........................ 364/493 |
| 4,059,747 | 11/1977 | Brody ............................ 364/493 |
| 4,218,737 | 8/1980 | Buscher et al. .................. 364/493 |
| 4,419,665 | 12/1983 | Gurr et al. ...................... 364/493 |
| 4,489,386 | 12/1984 | Breddan .......................... 364/493 |
| 4,510,398 | 4/1985 | Culp et al. ...................... 364/493 |
| 4,511,979 | 4/1985 | Amirante ........................ 364/493 |
| 4,567,566 | 1/1986 | Araya et al. ..................... 364/493 |

OTHER PUBLICATIONS

Papathomas et al, "Stored Program Control of DC Power Plants", Conf.: Intelec 81, May 19-21, 1981, pp. 18-23.

Savelyev, "How to Use PCs for Energy Management Systems", Control Engineering, Feb. 1979, pp. 39-41.

Primary Examiner—Thomas H. Tarcza
Assistant Examiner—Gregory C. Issing
Attorney, Agent, or Firm—Jones, Askew & Lunsford

[57] ABSTRACT

A method and apparatus are provided for monitoring an energy management system which controllably drops load in response to preselected conditions. The apparatus periodically interrupts the energy management system to restore full load. The apparatus monitors energy usage immediately prior to interrupting the energy management system and also monitors the energy usage during interruption when the load is restored. The information gathered at these two times represents the actual energy used when the energy management system is conserving energy, and when the energy management system is disabled and full energy usage is realized. The difference between the two energy usages represents the energy savings realized by using the energy management system.

23 Claims, 7 Drawing Sheets

LOAD PROFILE CURVES

APPARATUS AND METHOD FOR MONITORING AN ENERGY MANAGEMENT SYSTEM

TECHNICAL FIELD

The present invention relates generally to energy management systems which controllably drop load to maintain energy consumption below a predetermined level. The invention is more particularly directed to an apparatus and method for monitoring an energy management system and determining the savings in terms of energy and dollars realized by using the energy management system.

BACKGROUND OF THE INVENTION

A public utility, such as an electric generating company, has certain public responsibilities and obligations. One of the responsibilities of an electric utility is to ensure sufficient electricity for the needs of residential, commercial and industrial users. Electric utilities routinely forecast future needs and build generating facilities to accommodate these needs.

For a long period of time, electric utilities were able to predict growth without very much difficulty. However, some years ago the growth pattern of electricity use changed. For example, for many utilities located in temperate climates, the demand for electricity during the times of the year when air conditioning is used is far greater than the demand for electricity during the seasons when air conditioning is not in widespread use. Simply put, the demand for electricity in the summertime is far greater than the demand for electricity in the wintertime for these utilities. For utilities in colder climates, electrical usage may peak in the wintertime. To carry out its public charge, however, electric utilities must plan sufficient production facilities to meet the highest anticipated demand during the year.

There are several ways that electric utilities meet the peak electricity demand. One approach is to use pumped storage facilities which pump water into a reservoir during off-peak periods and then use the stored water to run a hydrogenerator during peak periods of the day. It is known that in the summertime, the peak period will probably occur between twelve noon and midnight. With this information, an electric utility can plan to use electricity to pump water into the reservoir between midnight and noon, and then use the stored water between noon and midnight to run hydrogenerators to meet the peak demand. Another method of meeting the peak demand is to utilize an additional oil or coal fired generating unit. Yet another method is to purchase the electricity from another utility which has excess capacity, albeit at a premium. All of these methods, needless to say, are expensive propositions for the utility.

While it appears that the electric utilities are in a difficult position, it is the electric utility customers who are ultimately responsible for the bill. It is arguably fair that the users of electricity who create the demand for extra facilities or for expensive electricity purchased from other utilities should pay extra for having their demand met. This is exactly what the electric utilities attempt to do. For residential customers, for example, the electric utilities may stagger the rates so that for a base amount of electricity use, the residential customer pays a small amount, and for each successive unit above the base amount, the residential customer pays based upon a rate which gradually increases. This staggered rate is designed to encourage residential customers to conserve electricity.

Similarly, commercial and industrial users are also encouraged to conserve electric energy. With large commercial and industrial users, measurement of the electric energy consumption is somewhat different than with residential customers. Residential customers typically pay for each kilowatt-hour (kWh) of electricity used. On the other hand, commercial and industrial users have their energy consumption measured not only in terms of kWh used, but also by a demand meter which functions to record the peak usage of that particular customer. With this system, the customer can be charged a rate or premium according to his peak usage, since it is this peak usage to which the electric utility must build facilities to generate electricity. Accordingly, it behooves these customers to keep their peak usage as low as possible.

Energy management systems ("EMS") came into being to assist heavy electric users reduce overall consumption and keep peak energy usage below a predetermined level. Electric utility companies have monitored electric consumption for years and have systematically dropped load from selected customers to prevent the energy demand from exceeding the energy supply. Electric utilities were able to do this by identifying certain users of electric energy who could tolerate temporary interruptions of power without great harm. Energy management systems allow smaller commercial or consumer users to do the same thing. For example, there are known hotel/motel energy management systems which selectively turn off air conditioners when a room is unoccupied or unrented, or periodically interrupt the air conditioner operation during peak load times.

U.S. Pat. No. 4,059,747 discloses a demand controller which controls the operation of one or more interruptible electrical loads to maintain the total electrical power demand during a demand interval within certain predetermined limits. The demand forecast makes periodic projections of the metered demand to the end of the demand interval based upon the current rate of energy consumption ("instantaneous demand") and the accumulated energy consumption during the demand interval. If the projected value indicates that a demand peak will occur, the system signals a "shed" condition for the load, thereby interrupting the load to prevent the occurrence of the peak. Conversely, if the system detects a projected low value of the demand, a "restore" condition is triggered, whereby the load is turned on to take advantage of the available electrical capacity.

U.S. Pat. No. 4,489,386 discloses a device control system which provides a method of determining when loads are to be disabled, to prevent the total consumption from exceeding a predetermined threshold. This system bases the decision-making process on past consumption, past load shed and activity, and predicted future load activity. The controlling algorithm is applied to the present consuming situation for a plurality of different time interval configurations, and the worst-case result of these computations controls the load shedding.

While energy management systems are satisfactory for keeping energy consumption below a preselected threshold, it is apparent that energy usage could be further reduced by appropriate planning. For example, in a hotel or motel, energy usage could be reduced by operating water heaters between midnight and the early morning hours when other energy usage is low and operating the heating/air conditioning only during preselected times regardless of what a room occupant does with the thermostat. While it is conceivable that such a scheme could produce some results, the consequence of exceeding the preselected peak demand is a severe penalty from the power company. Understandably, penalties for exceeding the peak demand are to be avoided. Accordingly, it will be understood that it would be highly desirable to provide an energy management system which not only maintains the energy usage below a predetermined threshold, but which also gives an indication as to the amount of energy management system is saving.

SUMMARY OF THE INVENTION

According to one aspect of the present invention, an apparatus is provided for monitoring an energy management system of the type which controllably drops load in response to preselected conditions. The apparatus includes means for periodically interrupting the energy management system to restore full load. The apparatus also includes means for monitoring energy usage and demand and generating first and second signals. The first signal is representative of the energy usage and demand at a time $T_{ni}$ before the interrupting means interrupts the energy management system. Also included is means for monitoring energy usage and demand and for generating a second signal representative of the energy usage and peak energy demand at time $T_i$ when the interrupting means interrupts the energy management system. The apparatus determines the difference in energy usage and demand at times $T_i$ and $T_{ni}$ and computes energy savings.

According to another aspect of the present invention, there is provided a method for determining energy saved by an energy management system which controllably drops load under predetermined conditions. The method comprises periodically interrupting the energy management system and restoring full load, generating a signal representative of energy usage at a time $T_{ni}$ when the energy management system is not interrupted, generating a signal representative of energy usage at time $T_i$ when the energy management system is interrupted, determining any difference in energy usage at times $T_{ni}$ and $T_i$, and multiplying the difference by an energy rate.

By providing an indication of the effectiveness of an energy management system, the present invention overcomes a problem inherent in prior art energy management systems which affects their desirability, although it may not adversely affect their operation. Accordingly, the present invention enhances an energy management system by monitoring the system and computing the actual energy savings realized by using that energy management system so that its effectiveness is known.

Briefly stated, the present invention operates by the method of (1) interrupting the functions of an energy management system, (2) measuring the rise or change in kilowatts, (3) restoring operation of the energy management system, (3) waiting for a predetermined period of time, typically a few hours, (4) again interrupting the energy management system, (5) again measuring the rise or changes in kilowatts, (5) again restoring the function of the energy management system, (6) averaging the two kilowatt changes or rises, and (7) multiplying this average rise of change by the time in hours between interruptions, to provide an energy savings in kilowatt-hours. These results are displayed or printed for evaluation.

It is an object of the present invention to provide an apparatus for monitoring an energy management system and determining the total energy savings and the demand energy savings of the system being managed by the energy management system. The energy management system controllably drops load under predetermined conditions which insure that a certain peak demand is not exceeded. The disclosed embodiment of the present invention monitors the energy management system and periodically interrupts the energy management system to allow the system to return to the full load condition. A first signal is generated which is representative of the energy usage and demand at a time $T_{ni}$ when the energy management system is not interrupted, and a second signal is generated which is representative of the energy usage and demand at a time $T_i$ when the energy management system is interrupted. These signals are used to determine any difference in energy usage at times $T_{ni}$ and $T_i$. This difference, if any, is multiplied by an energy rate to yield energy savings. Time $T_i$ occurs after time $T_{ni}$ so that the system has sufficient time to return to full load condition during the interval between $T_{ni}$ and $T_i$. In this manner, the signal generated at time $T_i$ is representative of the peak demand during that particular interval. Thus, the signal generated at time $T_i$ contains information regarding the peak demand, and the signals generated at both times $T_{ni}$ and $T_i$ contain information representative of the total energy consumption or watts for this time interval.

Another object of the present invention is to provide an apparatus which can be queried from a remote location. This objective is achieved by providing a monitoring system which can be remotely queried to determine results via a telephone modem.

Another object of the present invention is to provide a monitoring system which can be used to fine tune the energy management system. This objective is achieved by periodically interrupting the energy management system, restoring full load, determining the energy usage when the system is interrupted and when the system is not interrupted, and determining the energy savings. The energy management system can be altered so that the loads are controllably dropped at the predetermined conditions which yield the maximum calculated energy savings.

Another object of the present invention is to provide a simple method for determining energy savings which can be used independently of degree day data and occupancy data. This objective is achieved with the present invention which calculates energy savings on a real time basis by measuring energy usage and demand when the energy management system is operating, measuring energy usage and demand when the energy management system is interrupted, taking the difference of the two, and multiplying it by a rate factor which yields total energy saved and a dollar saved amount. Since the only data involved is the data related to the actual usage without the energy management system and the actual data with the energy management system, degree day and occupancy data do not enter into the calculation.

Still another object of the present invention is to provide a monitoring system for an energy management system which provides energy savings information yet which maintains total energy use below a predetermined peak level. This objective is achieved by providing a not-to-exceed target which is the level at which there is a danger of setting a new peak so that the monitoring system does not interrupt the energy management system when the not-to-exceed target is approached.

These and other aspects, objects, and advantages of the present invention will be more clearly understood and appreciated from a study of the following detailed description taken in conjunction with the accompanying drawings and the claims.

DETAILED DESCRIPTION OF THE PREFERRED EMBODIMENTS

Figure 1:
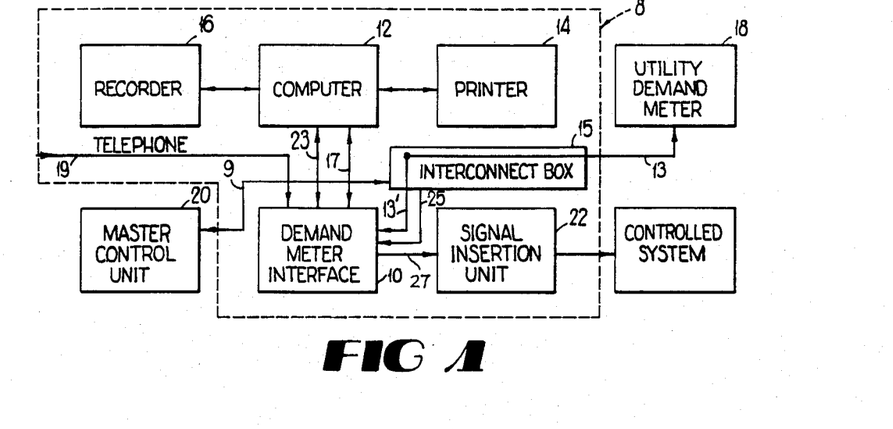
FIG. 1 is a block diagram of a preferred embodiment of an energy management system monitor constructed in accordance with the present invention.
Figure 2:
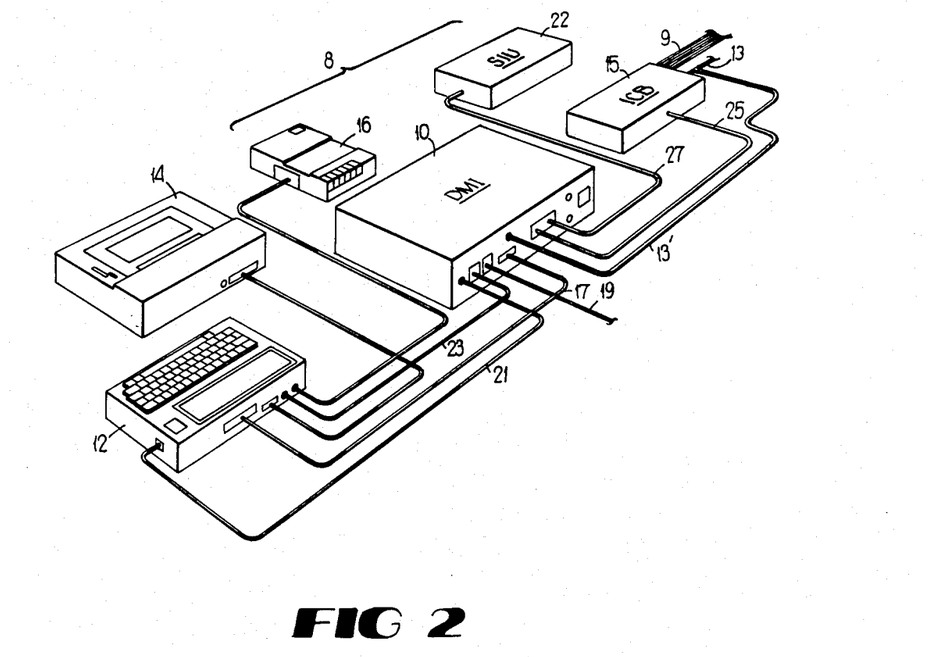
FIG. 2 is a layout diagram of the preferred embodiment of FIG. 1 illustrating the interconnection between the demand meter interface, computer, printer, storage device and telephone.
Figure 3:
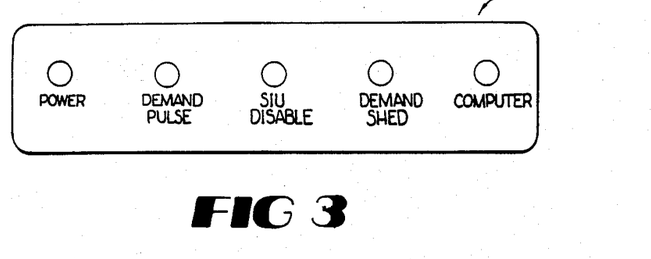
FIG. 3 is a somewhat enlarged view of the front panel of the demand meter interface of the energy management system monitor shown in FIG. 2.
Figure 4:
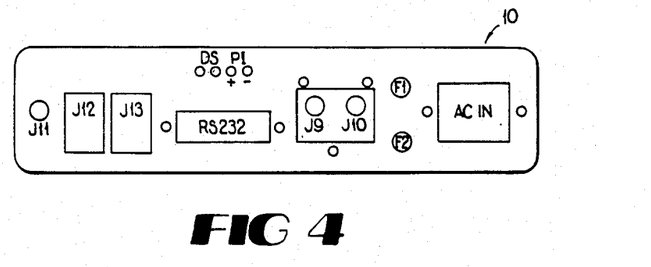
FIG. 4 is a somewhat enlarged view of the rear panel of the demand meter interface of the energy management system monitor shown in FIG. 2.

Referring to FIGS. 1 and 2, the energy monitoring apparatus determines the energy and demand savings of a building or other electrical system being controlled by an energy management system ("EMS"). The data gathered and printed can be used to determine the dollars saved, fine-tune the system, and insure that the user is experienced optimum benefit from the energy management system. The energy monitoring apparatus also eliminates the need for degree day and occupancy data in determining savings for shared savings or guaranteed lease programs. It can also be remotely queried to determine results via a telephone modem.

The demand meter interface ("DMI") 10 acts to interconnect signals from a pulse or utility demand meter 18, master control unit ("MCU") 20, a telephone line 19, a computer 12, and a signal insertion unit ("SIU") 22. It also has the responsibility of translating the pulses into usable information for the computer and breaking the connection between MCU 20 and SIU 22 when directed to do so by the energy monitoring system computer.

Another function of DMI 10 is to provide a contact closure for the EMS when a high demand limit is reached. The contact closure allows the EMS to go into a demand shed state (not shown in the drawings).

The computer 12 is preferably a Radio Shack Model 100/102 with a built-in telephone modem. The computer controls the other units and provides operating interface for conditioning the system and running through a test cycle. The cassette player 16 is preferably a Radio Shack computer cassette recorder model CRR-82 or equivalent and is used only to load the software initially or if a stand-by battery fails and program memory is lost. The printer 14 is any printer compatible with the preferred computer and is used to print out a permanent record of the information being collected by the energy monitoring apparatus.

To accurately determine how much an energy management system is saving, the amount of load that has been held off at any time must be known. The kilowatts of deferred load integrated over time in hours yields the energy savings in kilowatt-hours. The amount of deferred load during the monthly peak is the demand savings in kilowatts.

Figure 5:
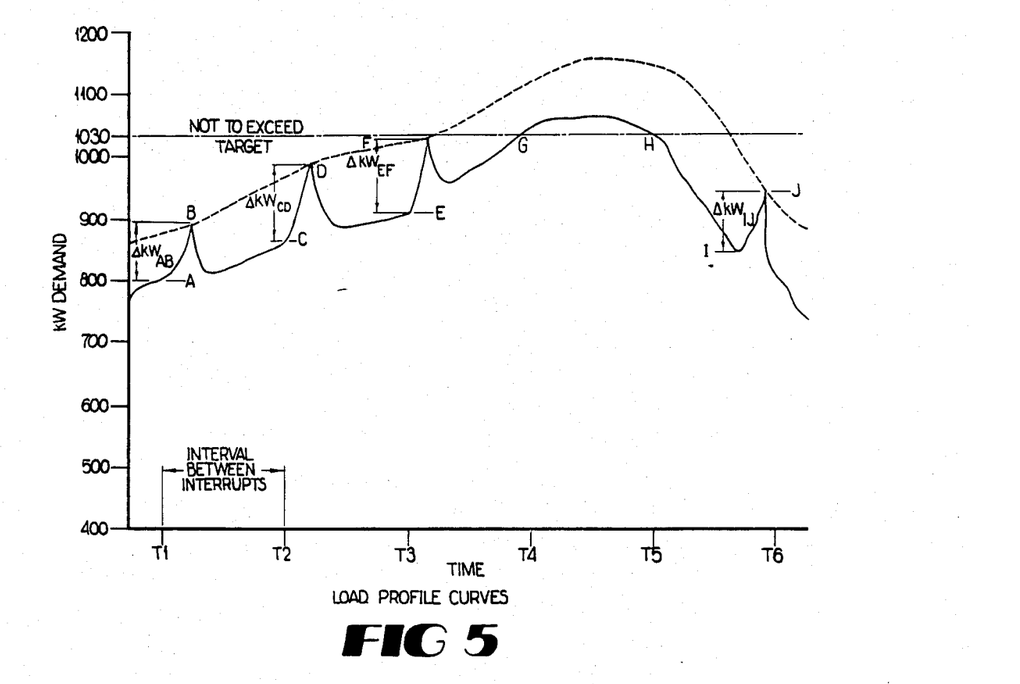
FIG. 5 illustrates load profile curves which illustrate how the preferred embodiment of the present invention determines savings.

FIG. 5 is a typical load curve covering a time span of approximately six hours. The horizontal axis represents time, which in this instance is about six hours of a typical day. The vertical axis represents load measured in kilowatts. The dashed line is the demand curve as it would appear without an EMS. The solid line is the actual controlled curve. The curve from A to B, which is an odd-shaped triangle, represents the demand curve when the EMS is shut off for a short period of time and then reconnected. This disconnection and reconnection is called an "interrupt". The $\Delta kW_{AB}$ is the measured difference between the controlled curve and the uncontrolled curve at time T1. The "not to exceed" target is the level at which there is danger of setting a new peak, so no EMS interruptions are allowed.

In order to determine the amount of load under control, the energy monitoring apparatus periodically disconnects the EMS and monitors the energy consumption as the EMS remote control units ("RCU's") time out, close their relays, and bring their loads back on line. These interruptions of the EMS are shown in FIG. 5 as the steep rise in kW between the controlled and uncontrolled curve. At time T1, the interruption is between points A and B. The system must wait approximately seven minutes for all of the RCU's to time out and reconnect their loads. FIG. 5 shows that the difference in the kW load between A and B ($\Delta kW_{AB}$) is the actual load under control at time T1.

After seven minutes of an interruption, the EMS is reconnected and the load returns to the controlled curve. Sometime later, say one hour, at time T2, the process is repeated. The difference in load from C to D ($\Delta kW_{CD}$) shows how much load was under control at time T2. Since energy is measured in kilowatt-hours (or kilowatts multiplied by hours), the kilowatt-hours savings due to the EMS between time T1 and T2 can be determined.

The time portion of the equation is T2-T1, which in this case would be one hour. The kilowatt portion of the equation is calculated as the average amount of load controlled during the period (i.e., ($\Delta kW_{AB}+\Delta kW_{CD}$)/2), in this case 112.5 kW. It can now be said that the EMS saved the following energy during the period from T1 to T2:

$$kWh_{T1T2} \text{saved} = ((\Delta kW_{AB} + \Delta kW_{CD})/2)(T_2 - T_1) = (100 + 125)/2 = 112.5 \ kWh.$$ (Equation 1)

The process is repeated at time T3 using $\Delta kW_{EF}\Delta kW_{CD}$ again and time as T3−T2. This process is repeated during the entire month and the data continuously accumulated by the computer; then, a figure for the monthly kilowatt-hours savings is derived. A similar reduction and savings in demand can be calculated using ΔkW difference at the highest point on the monthly control curve. Since a utility typically looks at only the one highest demand point for any month, the computer must use the ΔkW difference at the highest point. However, the chance of setting a peak higher than that on the controlled curve by interrupting the energy management system is very undesirable because of the penalty charged by the utility for having a higher peak demand. Therefore, during a high demand time, something else must be done.

The preferred embodiment of the present invention allows for a monthly "not to exceed" target to be set by the user. When the target is reached, the EMS is automatically reconnected and no interruptions are allowed while the demand level is above the target. Referring still to FIG. 5, the scheduled interruptions at T4 and T5 are skipped because the controlled curve is above the "not to exceed" target. The controlled curve is below the target at T6 so the system is interrupted, yielding $\Delta kW_{IJ}$. The energy savings for the period between T3 and T6 is then calculated by the formula:

$$kWh_{T3T6} \text{saved} = ((\Delta kW_{EF} + \Delta kW_{IJ})/2)(T6 - T3) = 270 \ kWh.$$ (Equation 2)

The demand reduction for that period would be $\Delta kW_{EF}$ because the five minute average prior to disable is highest at this point. If the five minute average demand prior to this test was greater than the five minute average demand prior to any other test this month, $\Delta kW_{EF}$ would be retained as the demand reduction for the month. However, if a later control demand level is higher than the level measured between T4 and T5, the $\Delta kW_{EF}$ would be discarded and a new value kept as the demand savings for the month. As information is collected in each time period, the computer can keep track of daily and monthly savings for a printout on a daily and monthly basis.

Referring to FIGS. 1-4, the preferred embodiment of the present invention comprises monitoring apparatus 8 for connection to a master control unit ("MCU") 20 of an EMS via a multiconductor cable 9. The apparatus 8 for monitoring the EMS includes DMI 10, a computer 12 with a built-in telephone modem, a printer 14, and a program storage unit such as a cassette player 16. The cassette player 16 stores the program for the computer 12 and the printer 14 is used to print the output of the computer 12. The computer is interfaced with the DMI 10 over RS232 lines 17. The demand meter interface 10 has a terminal J11 which supplies power to the computer 12 over lines 21, a terminal J12 which receives an incoming telephone line 19, and a terminal J13 which handles an outgoing telephone line 23. The demand meter interface 10 also includes a terminal J9 which receives a coaxial cable 25 from an interconnect box ("ICB") 15 and a terminal J10 which provides a coaxial cable 27 to an SIU 22. The interconnect box 15 facilitates the energy management functions, e.g., demand shedding, but plays no role in the monitoring functions other than provide signals from the demand meter 18.

There is also a terminal AC IN (FIG. 4) for receiving incoming power and appropriate places for fuses, F1 and F2. Terminal PI is provided for receiving pulses in from a conventional utility meter. Terminal DS provides a demand control signal to the MCU 20 via the interconnect box or ICB 15.

Referring specifically to FIG. 1, a block diagram of the monitoring apparatus 8 for use with an energy management system is illustrated. The demand meter interface 10 receives pulsed inputs over line 13' from a utility demand meter 18. The DMI 10 is also connected to an energy management system master control unit such as MCU 20, a telephone line 19, SIU 22, and the computer 12. When connected, the master control unit 20 will be constantly monitored by the demand meter interface 10. The master control unit 20 controllably drops load in response to preselected conditions such as a preselected target kilowatt demand, as indicated by the demand control signal DS. The monitoring apparatus 8 periodically interrupts the energy management system controller to restore full load and generates a signal representative of the energy usage at a time when the energy management system is not interrupted. The monitoring apparatus also generates a signal representative of energy usage at a time when the energy management system is interrupted. These signals are used to compute energy savings.

As will be more fully explained below, the demand meter interface 10 translates pulses from the utility demand meter 18 into usable information for the computer 12, and also breaks the connection between the master control unit 20 and the signal insertion unit 22 when directed to do so by the computer 12. The demand meter interface 10 also provides a contact closure to the energy management system when a high demand limit is reached. The contact closure allows the energy management system to go into a demand shed state.

Figure 8:
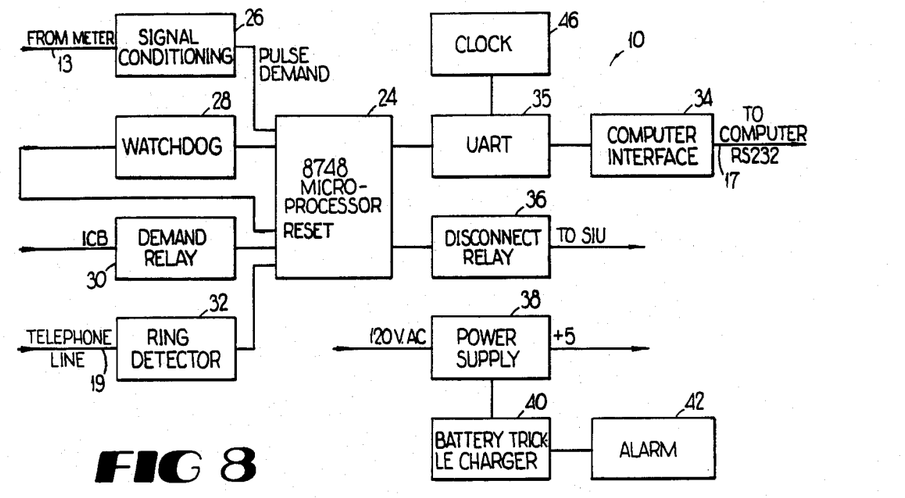
FIG. 8 is a block diagram of the preferred embodiment of the demand meter interface of FIGS. 1 $\propto$ 4.

Referring to FIG. 8, the central controller of the demand meter interface unit 10 is a microprocessor 24. A signal conditioning circuit 26 connects the demand meter pulse output signal on line 13 to the microprocessor 24. A proper operation watchdog circuit 28 watches over the operation of the microprocessor and resets the microprocessor if proper operation is not detected. A demand relay circuit 30 signals to the energy management system that a peak is on the way; a contact is closed upon command from the MCU. A ring detector 32 is used to detect when there is an incoming phone call. A computer interface circuit 34 is provided for adapting the microprocessor to a particular computer 12. A signal disconnect relay 36 disables the energy management system on command from the DMI. A power supply 38 receives the AC line voltage and converts it to DC voltages for operation of the system. A battery charger 40 trickle charges the battery BT1. The alarm circuit 42 alerts a user of the energy management system monitor of two conditions: (1) if AC power is removed from the system, but the computer 12 is plugged in and running off the batteries BT1, or (2) the computer 12 is not connected to the DMI while the DMI is operating under AC power.

Figure 9:
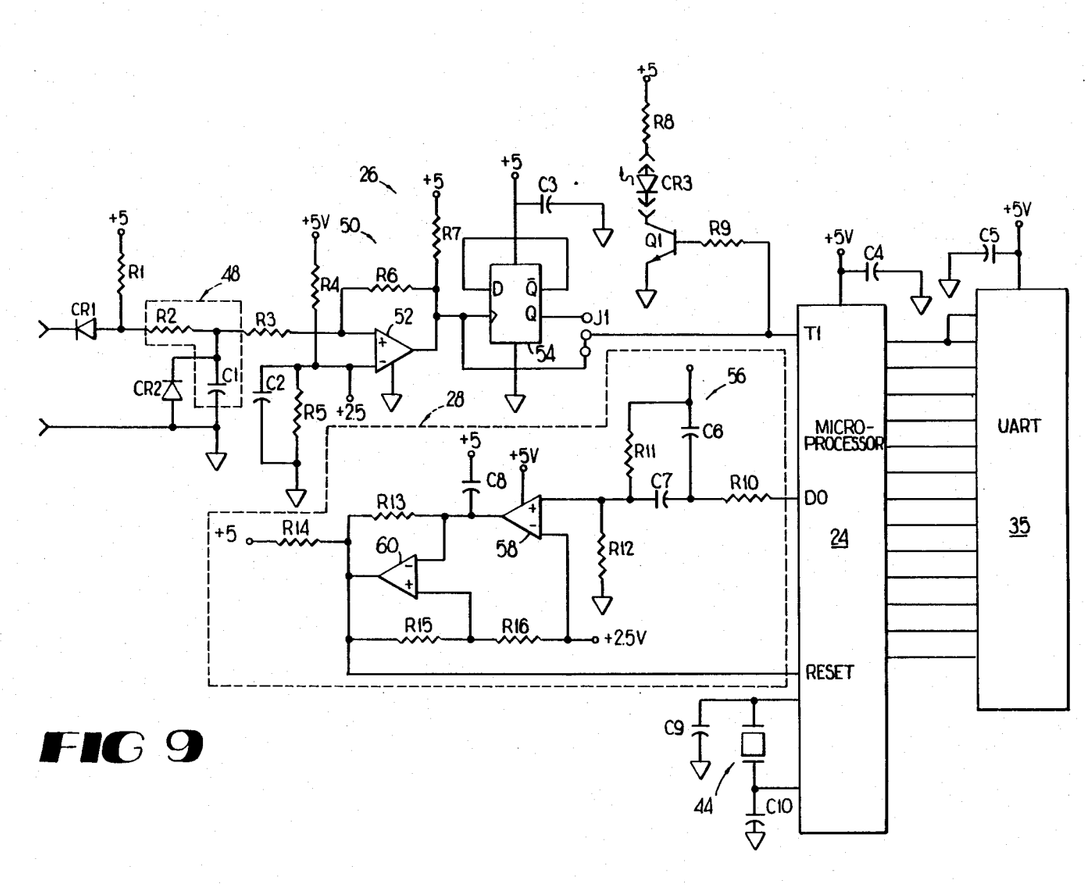
FIG. 9 schematically illustrates signal conditioning circuitry and a proper operation watchdog circuit of the preferred embodiment of the demand meter interface of FIG. 8.

Referring to FIGS. 8-9, the microprocessor 24 is preferably a type 8748 which has the signal conditioning circuitry 26 connected at the T1 test input. The proper operation watchdog circuit 28 is connected to one output D0 of the microprocessor bus port. A quartz crystal 44, preferably a 6 MHz unit, is connected to the microprocessor's internal oscillator. Ring detector 32 is connected to an input port line of the microprocessor. The demand relay 30 and signal insertion amplifier relay 36 are connected to output port lines of the microprocessor 24.

Referring particularly to FIG. 9, the signal conditioning circuit 26 receives a KY, KZ or equivalent pulse from the meter 18, and conditions it for provision to the microprocessor 24. The pulse is initially received by diode CR1 which has its anode connected to the junction between resistors R1 and R2. The other end of resistor R1 is connected to the positive supply voltage. The resistor R2 is part of a low pass filter network. The low pass filter network 48 includes resistor R2 and capacitor C1. Capacitor C1 has one end connected to the junction between resistors R2 and R3 and the other end connected to ground. A diode CR2 has its cathode connected to the junction between resistors R2 and R3 and is connected in parallel with capacitor C1. The other end of resistor R3 is connected to the input of a Schmitt-trigger 50 which comprises a comparator 52. The resistor R3 is connected to the positive input of comparator 52. Voltage divider resistors R4 and R5 and capacitor C2 are connected to the negative reference input of comparator 52. The other end of resistor R4 is connected to the positive supply voltage while the other end of resistor R5 is connected to ground. The capacitor C2 is connected in parallel with resistor R5.

The output of the comparator 52 is connected to resistors R6 and R7 with the other end of resistor R6 being fed back to the positive input of comparator 52. The other end of resistor R7 is connected to the positive supply voltage. The output of comparator 52 is connected to the clock input of a D-type flip-flop 54 which is this case is one-half of a 4013 flip-flop package. The output of comparator 52 is the signal denominated DEMAND pulse and is connected to the T1 test input of microprocessor 24. The flip-flop 54 is connected to operate as a divide-by-two circuit whenever the pulse rate is faster than the microprocessor sample rate.

The T1 test input of the microprocessor receives a signal either from the output of the comparator 52 or flip-flop 54 via jumper J1; this line is also connected to resistor R9 which is connected to the base of transistor Q1 which is preferably a 2N3904. The emitter of transistor Q1 is grounded and the collector is connected to positive supply voltage through resistor R8 and light emitting diode CR3. The light emitting diode CR3 will pulse at the KY or KZ rate, or half the KY or KZ if flip-flop 54 is used. By this construction, circuitry is provided which receives a KY, KZ or equivalent pulse, filters it through the low pass filter 48, shapes it through the Schmitt-trigger 50, and causes CR3 to flash indicating the demand pulse is being received.

Still referring to FIG. 9, the proper operation watchdog circuit 28 is connected to one of the bus port terminals of the microprocessor 24, which puts out a square wave at a frequency of approximately 416 Hz when the microprocessor is operating properly. Resistor R10 is connected to the same bus port terminal and has its other end connected to a capacitor C7. A capacitor C6 is connected at the junction of resistor R10 and capacitor C7 and has its other end connected to the positive supply voltage. Also connected to the positive supply voltage is resistor R11, whose other end is connected to the other end of capacitor C7. Resistor R12 has one end grounded and the other end connected to the junction of capacitor C7 and resistor R11. Capacitor C7 and resistors R11 and R12 are connected to the input of comparator 58. Capacitors C6 and C7 and resistors R10, R11, and R12 form a band pass filter centered about 416 Hz.

The negative input of comparator 58 is connected to a positive supply voltage of approximately 2.5v and is also connected to R16. The other end of R16 is connected to resistor R15 and to the positive input of comparator 60. The negative input of comparator 60 is connected to the output of comparator 58, to capacitor C8, and to resistor R13. The other end of capacitor C8 is connected to +5v positive supply voltage, while the other end of resistor R13 is connected to the output of comparator 60 and to a resistor R14, the other end of which is connected to +5v positive supply voltage. The other end of resistor R15 is also connected to the output of comparator 60 and to the reset terminal of microprocessor 24.

The proper operation watchdog circuitry looks for the 416 Hz pulses from microprocessor 24. The band pass filter 56 is designed to pass the microprocessor's output which is approximately 416 Hz in frequency. When the square wave is present, the comparator 60 does not oscillate. When the square wave is absent, indicating that the program for the microprocessor has stopped or is in an endless loop, comparator 60 oscillates at a low frequency (approximately 100 Hz), which resets the microprocessor 24.

Figure 10:
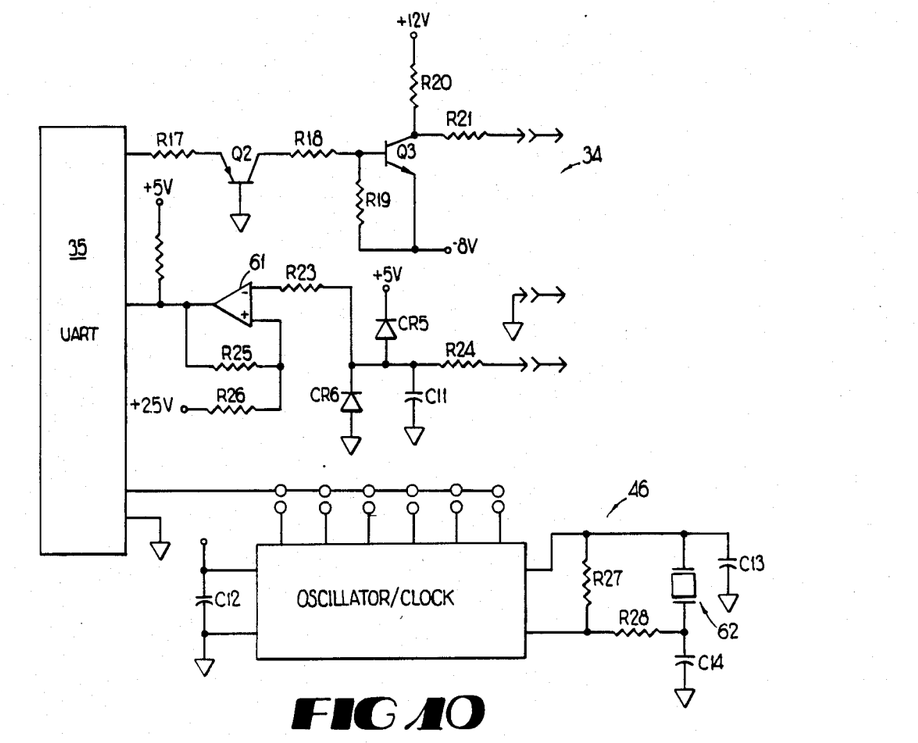
FIG. 10 schematically illustrates computer interface and clock circuitry of the preferred embodiment of the demand meter interface of FIG. 8.

Referring to FIG. 10, the computer interface 34 is connected to a universal asynchronous receiver-transmitter ("UART") 35 which is connected to the microprocessor 24. In the preferred embodiment, the computer 12 is a Radio Shack Model 100/102 with a built-in telephone modem. The interface includes a resistor R17, one end of which is connected to UART 35. The other end of the resistor is connected to the emitter of transistor Q2, preferably a 2N3906. The base of transistor Q2 is grounded and the collector is connected to resistor R18, the other end of which is connected to the base of transistor Q3 and to resistor R19. The other end of resistor R19 is connected to the emitter of transistor Q3, preferably a 2N3904. The collector of transistor Q3 is connected through resistor R20 to a positive supply voltage. A resistor R21 is also connected to the collector transistor Q3 and is the output RS232. Resistor R19 and the emitter of transistor Q3 are connected to -8v negative supply voltage.

UART 35 is connected through pull-up resistor R22 to +5v and is also connected to the output of comparator 61. The positive input of comparator 61 and its output are connected by resistor R25. The positive input of comparator 61 is also connected through resistor R26 to +2.5v supply voltage. The negative input of comparator 61 is connected to resistor R23. The other end of resistor R23 is connected to diode CR6, diode CR5, capacitor C11 and resistor 24. The other end of resistor 24 is the input from RS232. The cathode of diode CR5 is connected to +5v and the anode of diode CR6 is grounded. The other side of capacitor C11 is similarly grounded.

Still referring to FIG. 10, the clock circuit 46 includes a type 4060 counter circuit which derives its oscillation frequency from crystal 62, which is preferably a 2.4576 MHz crystal unit. In this configuration, the 4060 acts as a divider to divide the output from the oscillator 62 into a plurality of frequencies which can be input to UART 35.

Referring to FIGS. 1 and 8, the microprocessor 24 receives conditioned pulses from the demand meter 18, times the pulses, and presents this data to the computer 12. Additionally, it controls disconnect relay 36 to disable the SIU 22, and to signal that a high demand situation exists. Two control relays, demand relay 30 and disconnect relay 36, are AC driven by a 416 Hertz signal from the microprocessor 24. This reduces the likelihood of a relay being left energized due to a component failure. The frequency selective watchdog circuit 28 monitors the microprocessor 24 and resets it if any failure is detected. The microprocessor 24 communicates with the control computer 12 via the RS-232 interface. Data rates are selectable from 300, 600, 1200, 2400, 4800, and 9600 bits per second. The data word is 8 bits with no parity. Five LED's are used to indicate power on, received pulse rate, SIU disconnected, demand shed, and computer power.

Figure 11:
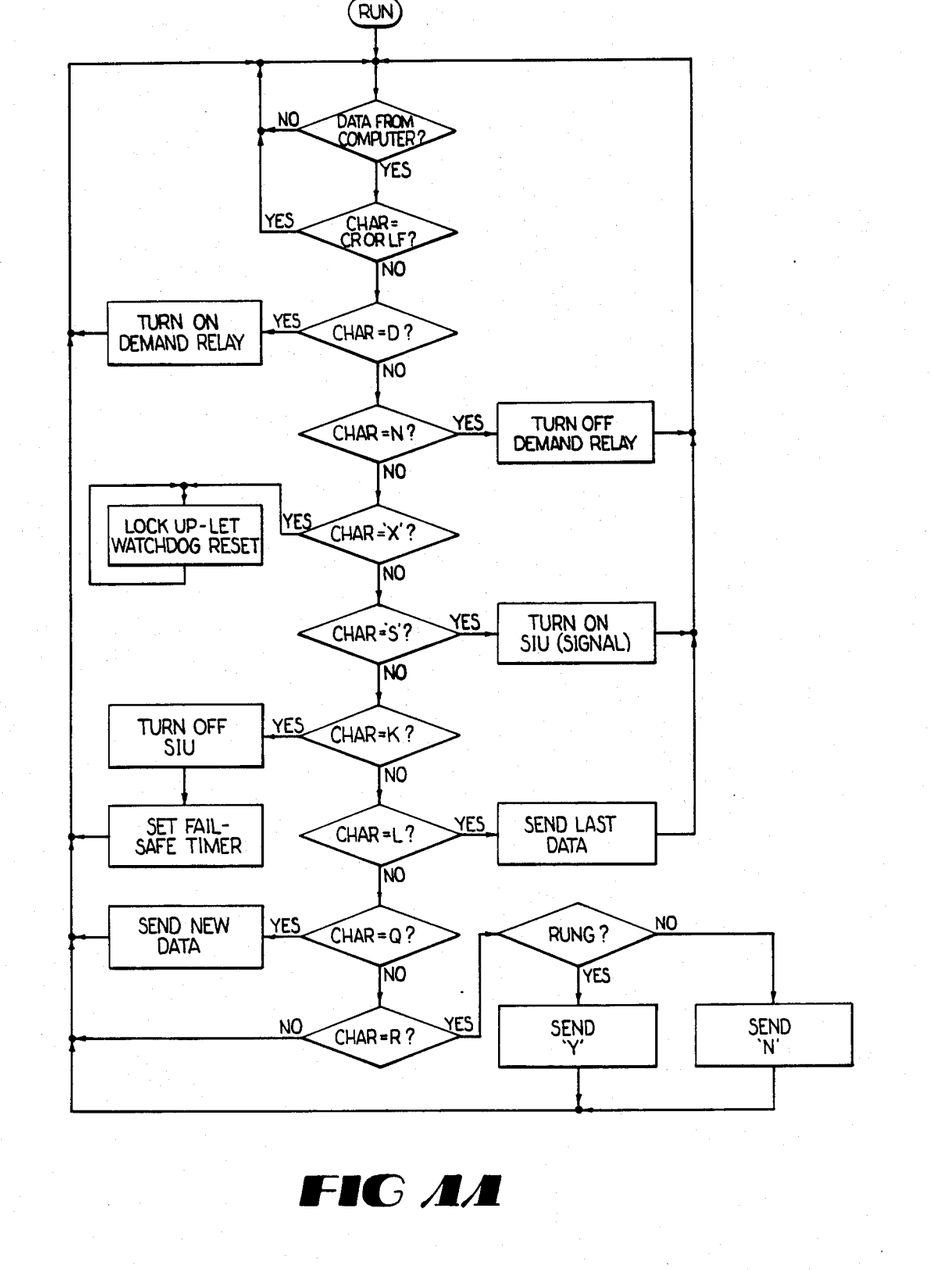
FIG. 11 is a flow chart illustrating operation of the preferred embodiment present invention.

As illustrated in the flow chart of FIG. 11, the energy monitoring system interface microprocessor 24 will respond to several commands from the control computer. These demands may take the form of an alphabetic character which is input from the keyboard of the computer 12. The commands and their meanings are as follows:

Q. Query for data. Responds with two numbers, the first a five digit number indicating the time in 1.2 millisecond increments between the latest pulse transition and the transition from which it began counting. The second number, three digits long, is the number of transitions it has counted. The numbers are separated by a comma, and followed by CR/LF. Upon this transmission, the microprocessor 24 resets its counters and restarts fresh.

L. Last data. Responds in the above format but merely repeats the last transmission.

D. Demand signal. Turns on the demand relay 30.

N. No demand. Turns demand relay 30 off.

K. Kill SIU. Turns on a disconnect relay 36, and also a 15 minute timer. This timer will automatically turn off disconnect relay 36 in the event that the following instruction is never received.

S. SIU activate. Turns off the disconnect relay 36, reconnects SIU 22.

R. Ring detect. Queries ring detector 32 at least every four seconds. Responds with Y or N.

X. Reset microprocessor. Resets microprocessor 24 for whatever reason.

Still referring to the flow chart of FIG. 11, the microprocessor 24 responds to the commands from the computer 12. When data is received, microprocessor 24 ignores command characters CR or LF. If the command characters are not CR of LF, the microprocessor 24 responds to the commands listed above. If the command is D, the demand relay 30 is turned on. If the command is N instead of D, the microprocessor 24 turns off the demand relay 30. An X command disables the square waves to the watchdog circuit 28, thereby resetting microprocessor 24.

When the command is not CR, LF, D, N, or X, but S instead, SIU 22 is activated placing the controlled system under the control of MCU 20. In contrast, a K command turns off SIU 22 thereby interrupting control of the controlled system by MCU 20 and restoring full load. This K command also starts a 15 minute failsafe timer in microprocessor 24.

When the data sent is not command CR, LF, D, N, X, S, or K, but is L, the last transmission to the computer 12 is repeated. If there is no L command, but a Q command instead, the microprocessor sends the latest demand data to the computer 12. If there is no Q command, but an R command instead, microprocessor 24 queries whether the telephone has rung and responds with Y or N for yes or no.

The programming of the energy monitoring apparatus consists of following the steps given below and the prompts given by the computer. The purpose of the programming is to establish the criteria necessary to determine energy and demand savings. For programming a new system, when initiating the program, the main menu will display several files with the cursor on BASIC. If this is the first time system has been programmed, then the time and date must be set. The program is accomplished according to the following steps:

Step 1. With the cursor on BASIC hit <ENTER>. The computer will give the prompt "OK" with the flashing cursor on the next line.

Step 2. Enter the time of day in the following format: TIME$="HH:MM:SS"<ENTER>.

Step 3. Enter the month, date, and year in the following format: DATE$=(MM/DD/YY)<ENTER>.

Step 4. Hitting the <SHIFT> and <BREAK> keys at the same time returns the main menu.

Step 5. Use the cursor movement keys which move the cursor right and down to get to the EMS.BA file and hit <ENTER>. In the preferred embodiment, the energy management functions are performed by a BASIC program for the computer 12 called EMS.BA. The predominant portions of these functions are not a part of the present invention; accordingly, no further discussion of the conventional energy management functions of this program will be provided. However, the EMS.BA program also is operative to provide commands to the microprocessor 24 to enable the microprocessor to carry out the energy monitor functions. In particular, it will be understood that both the computer 12 and the microprocessor 24 play a role in effectuating the energy monitoring functions.

The program for computer 12 provides an output of characters which comprise commands to which the microprocessor is responsive; the program for microprocessor 24 is responsive to the commands to cause interruption of the energy management functions, receipt and initial processing of the energy usage signals from the meter, and provision of data representative of the energy usage back to the computer 12, which then performs certain calculations and formats the data for display. Those skilled in the art, after the discussion which follows, will understand that the computer 12 is responsible for basic timing of the commands to the microprocessor 24, for example, when to actuate and deactuate the SIU, as well as the basic calculations upon data representing the energy usage. On the other hand, the microprocessor 24 is responsible for control of the SIU to effectuate interruption of the energy management functions and restoration of load, as well as provision of signals representing energy usage to the computer 12.

Step 6. The menu will now be displayed. The choices at this point include: F1 enter new configuration; F2 view configuration; F3 print configuration; F4 run.

F1 allows the user to change any part of the configuration one item at a time. This menu option can also be referred to as change configuration. Option F2 allow quick review of the configuration without the change capability. The print configuration allows the contents to be printed but it will not print if the print option is zero. The run option F4 starts the system test. At the end of test, control is passed automatically to the run menu. When the system test is first started, the display indicates the system is accumulating data for the first five minutes. During this time it displays a progressively increasing demand as it accumulates the data base. After five minutes, the display changes to show the system test is in progress. The test can be terminated by pressing "T".

Step 7. New configuration. Since a new configuration is being entered, the F1 key is appropriate. The computer then asks for configuration data.

Step 8. Pulse constant. The first inquiry is the pulse constant. This can be calculated as explained below. Enter the value in kW hours per pulse.

Pulse information can be given as pulses/disk revolution (P/DR), Mp, revolutions per impulse (R/I), revolutions per pulse (R/P), or kilowatts per pulse (kW/P). The calculation depends on the manner in which the utility company presents the pulse information. Additional information required to make the proper calculation includes $K_h$ of the meter which is typically 0.1 to 10.0, current transformer ratio ("CTR") which is 1 if no current transformers are used, and potential transformer ratio ("PTR") which is also 1 if no potential transformers are used. If a pulse/disc revolution is given, then the calculation is kWh/pulse=$(K_h)$ (CTR) (PTR) (P/DR) (1000). For a 15 minute billing interval, kWh/pulse=kW/pulse÷4. For a 30 minute billing interval, kWh/pulse=kWh/pulse÷2.

Step 9. Test period. The next question is the monitoring period which is the interval between interrupts. A number between 12 and 3200 minutes is entered.

Step 10. Disable time. Enter the length of time that the energy monitoring apparatus is to disable the EMS. This can be between 6 and 3200 minutes, but should be relatively short. Seven to ten minutes is recommended.

Step 11. Printer. The next question asks for the amount of information to be printed out each day. The computer asks for a selection of one of the following choices: 0. No printer connected. 1. Print only the daily and monthly summaries during a system test. 2. Print all of number 1 plus 5 minute average demand prior to disable, the highest demand during disable, and the kilowatt-hours saved during the monitoring period. 3. Print all of numbers 1 & 2 plus the 5 minute demand average during the time the SIU is disabled.

The user enters the desired print selection number. If the printer is connected, care must be taken to insure that the printer is on line and that it does not run out of paper. If the printer is off line or runs out of paper, the program will stop running until the problem is corrected. When the problem is corrected the program will automatically start running. However, no data is collected during the down time.

Step 12. Cost per kWh. The user enters the appropriate cost per kWh figure in dollars. This allows the energy monitoring system to put a dollar figure to the kWh savings.

Step 13. Cost per kilowatt. The user enters the appropriate cost per kilowatt figure in dollars. This allows the energy monitoring system to put a dollar figure to the kilowatt savings.

Step 14. Monthly kW target. The monthly kW target, demand shed level, demand restore level, and meter reading date are handled in this step. For example, for January, the user types in a target "not to exceed" kilowatt, then <,>, the kW level at which the demand contact should close, then <,>, the kW level at which the demand contact should open (at value less than the closing level), then <,>, the approximate meter reading date, and then <ENTER>. This will advance the month to February where the steps are repeated. Hitting <ENTER> advances through the months. After entering December's data, hitting <ENTER> will advance the user back to the energy monitoring system menu.

Step 15. View and to print configuration. In order to view the configuration as entered, hit <F2> and follow prompts from the computer. For a printout of the configuration, hit <F3>.

Step 16. Run. At this time the energy savings recorder program is ready to run. Hit <F4>. The energy monitoring system always starts out with a 22 minute system test. This will display information as described in the system verification test below. At 22 minutes after hitting <F4> for run, the system starts of perform the energy savings recording as configured.

Reprogramming an existing system is somewhat less complicated. If the system has been programmed previously, skip steps 1-4 and start with step 5 to enter a new configuration, or jump to step 16 to run the program.

After installation and configuration, the energy monitoring system is made operational by pushing the F4 key on the menu. The system then begins to measure the energy consumption in demand in the building. The system interrupts the energy management system at the appropriate times, calculates the savings, and accumulate the data for subsequent printing. At midnight each day, the system prints out the following daily report data:

Daily report.
Date
kWh this month
kWh since midnight
kWh last 24 hours
kWh savings last 24 hours
% kWh savings:
$ savings The first line indicates the report is a daily report, the second line gives the accumulated kWh since initialization. The next line gives the kWh for the last 24 hours which is followed by the kWh savings in the last 24 hours. Next, the percentage savings in the last 24 hours is given and finally a dollar value of the kWh savings is printed.

On the last day of the billing period immediately following the midnight printout, an additional monthly printout occurs as follows:

Monthly report.
Date
kWh this month
Total kWh savings
% kWh savings
$ value of kWh savings
kW savings
$ value of kW savings
Total monthly savings
Total since reset As indicated, this data is a monthly report. As before, the report lists the date and time and the accumulative kWh since initialization. Next the total kWh savings is given and then the kWh savings. This is followed by a dollar value of the total kWh savings which is followed by the kWh savings. The kW savings is followed by a dollar value of the kW savings, a total dollar value of savings and a cumulative dollar value of year to date savings with the dates noted. The system automatically erases monthly cumulative kWh data and starts over for the next month, storing only the cumulative year to date totals for later use. A typical example of the measurement and interrupt process is given below. This example has a one hour interval between interrupts and a six minute interrupt time:

Step 1. Time 00:00 to 00:05. Measures time interval between pulses, calculates kW, averages these values for 5 minutes, stores and prints with the notation "5 minute average" along with date and time the test was initiated. This operation occurs in real time so actual times are printed, but this example starts at clock time 00:00 for illustration.

Step 2. Time 00:05. Interrupts energy management system.

Step 3. Time 00:05 to 00:11. Measures pulse intervals, calculates kW averages for each minute, stores highest two values, computes average of those two, and prints with notation "highest value".

Step 4. Time 00:11. Reconnects energy management system.

Step 5. Time 00:11. Subtracts value in Step 1 from value in Step 3 and stores the information. This becomes the first ΔkW value for the kWh calculation.

Step 6. Time 01:05 to 01:11. Repeats Steps 1 through 5. The ΔkW value derived from the 01:11 subtraction becomes the second kW value for the kWh calculation. The system adds the first and second values and divides by two to calculate the average ΔkW. This value is multiplied by time to obtain the kWh savings for the period from 00:11 to 01:11, which in this case is 1 hour. This value is printed and stored and identified as kWh savings for the period 01:05 to 01:11.

Step 7. This procedure is repeated each hour (varies with the monitoring period) until 24:00. At that time, the next step is performed.

Step 8. Time 24:00. Adds up all incremental kWh savings values, multiplies by cost per kWh, prints the dollar value of energy saved during this period. Saves the dollar value in storage for the end of month savings calculations.

Step 9. Time 24:05. Starts procedure again same as in Step 1. Continues until end of month when it will add up all daily dollar values and print totals.

Since the energy monitoring equipment interrupts the operation of the energy management system during this monitoring process, a slight increase in kW consumption occurs. Therefore, the period of monitoring, time between interrupts, and interrupt time must be selected wisely. Decreasing the time between interrupts, and/or increasing the interrupt time will increase the kWh consumed and the electric bill. The target kW will minimize the effect of the test on the peak demand.

During normal operation, the monitor also continuously calculates kW for a rolling five minute period. Any time this value exceeds the "not to exceed" target value to be entered by the user, the system reconnects the energy management system and prints rolling values of kW at that time and each five minutes as long as kW is above target. When the five minute rolling kW drops below target, the interrupt process is restarted and the notation is printed. If the program is prevented from obtaining a valid ΔkW because kW is over the "not to exceed" target, then the energy monitoring system uses the ΔkW value from the last valid point and generates an estimated kWh value for the interval. It makes a notation on the printout to flag this value as estimated.

In order for the operator to verify that the system is working, a special test monitor command can be entered which causes the system to go through a preprogrammed test cycle and print data as it goes. This test cycle is as follows:

1. Prints average kW each minute for five minutes. 2. At the five minute point, interrupts EMS signals to SIU. 3. Places "*" beside each kW value printed while the system is interrupted. 4. Prints average kW each minute for 17 minutes. 5. Seven minutes after interruption, restores EMS signals to SIU. 6. Discontinues printing of kW values automatically 17 minutes after Step 2 above unless the system is unhooked.

The following illustration demonstrates the system verification test. When the operator presses the key, the energy monitor automatically prints all entered parameter data, and then proceeds as follows:

Step 1. Time 00:00 to 00:05. Measures time interval between pulses, calculates kW, averages these values and prints kW each minute for five minutes. Again, actual times will be printed, this example starts at clock time 00:00 for illustration. [Note: The system verification test is run automatically when the EMS is first put into the "run" mode. Only during that first verification step is step 1 appropriate; all other verification tests begin with step 2.]

Step 2. Time 00:05. Prints average of previous five entries and interrupts energy management system.

Step 3. Time 00:05 to 00:12. Prints average kW each minute for seven minutes. Places an "*" by each reading to show SIU is interrupted.

Step 4. Time 00:12 to 00:22. Prints the average kW each minute for 10 minutes.

Step 6. Time 00:22. Prints "end of test" and the results of the test in kWh savings. The system then automatically goes into a standard monitoring mode.

The energy monitoring system provides a separate normally open contact closure with separately adjustable shed point and restore point. A sliding five minute average kW is maintained to trigger the initiation of shed and restore via this contact. This serves as an input for MCU 20 to accomplish demand control.

Loss of power to the system for no more than about nine hours will not erase data. When power is restored, the system will automatically initialize and pick up at the correct time. Loss of power to the unit or other internal failure does not compromise operation of the EMS system which it is monitoring.

Figure 6:
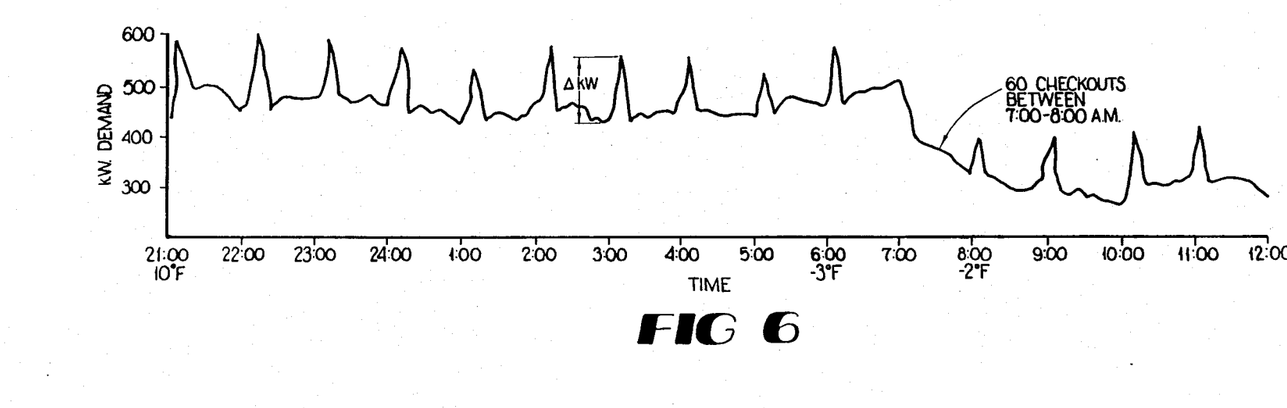
FIG. 6 is a load profile curve for an exemplary multi-story, multiroom hotel constructed from actual data during the period from 9 p.m. until 12 noon.

FIG. 6 is a graphic illustration of the energy savings recorded with the preferred embodiment of the energy monitoring apparatus of the present invention. The particular data was taken during a typical winter day and is for a 169 room multi-story hotel which had an occupancy rate of approximately 86% and an occupied cycle rate of 30% and an unoccupied cycle rate of 60%. The savings average approximately 19% for this period. As ΔkW indicates, the energy management system was in fact saving energy during this operation as indicated by the peak which occurs when the energy management system is interrupted allowing the dropped load to be restored.

Figure 7:
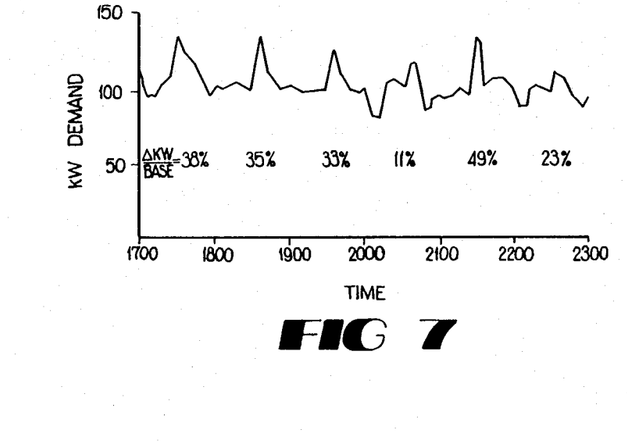
FIG. 7 is a load profile curve for another exemplary hotel taken over the period from 2 p.m. to 6 a.m.

FIG. 7 is another illustration of the energy monitoring system being used to monitor an energy management system for a hotel. This particular hotel is located in the midwestern United States and the test was conducted on a late summer day. In this test, the energy management system was disabled for 12 minutes each hour beginning at 26 minutes past each hour. In this particular hotel only 76% of the rooms were under the control of the energy management system. As the graph illustrates, the change in the kW used increases from about 11% to about 49% during the test period. The average ΔkW for the six hour period under consideration was approximately a 29% increase. This ΔkW represents a tremendous energy savings for the user of the present invention.

It will now be understood that there has been presented an apparatus for monitoring an energy management system and determining the total energy savings and the demand energy savings of the building or system being managed by the energy management system. The monitoring apparatus can be remotely queried over a telephone line from a remote location. The monitoring system can be used to fine tune the energy management system and its use is independent of degree day and occupancy data. The energy monitoring apparatus receives standard KY or KZ pulses from a utility demand meter and can automatically provide printouts each midnight and at the end of each month to provide summary of information about energy usage and dollar savings.

The energy monitoring apparatus controllably disables the energy management system at appropriate times to determine the load under control and savings. Savings and usage information is available remotely through a telephone modem interface. With a telephone, the computer can be accessed and information gathered. As a safety or security measure, an access code is required for using the telephone. A preprogrammed test cycle provides immediate information on the system operation and savings. The system operates and calculates the energy savings without need for information such as degree days, occupancy, and previous rates used in basing the savings calculation. This is possible because the energy savings calculation is based upon an actual measurement of the energy being consumed while the energy management system is operating as well as when the energy management system is interrupted.

Other features of the energy monitoring apparatus include dry contact closure which signifies a high demand condition and a restore point bandwidth setting which prevents "hunting". There is an automatic restart of operation after power is restored to the system. The power requirement for the system is only 40 watts at 120 volts AC. The system is portable and compact. The system is self contained and has internal rechargeable batteries for short term power backup. Except to periodically replace printout paper, no operator is needed.

As will be evident from the foregoing description, certain aspects of the invention are not limited to the particular details of the examples illustrated, and it is therefore contemplated that other modifications or applications will occur to those skilled in the art. For example, the foregoing description describes the invention using a Radio Shack Model 100/102 computer which performs the desired functions and has the advantage of being a low cost computer. It is obvious that other, more expensive, computers can be used. It is accordingly intended that the claims shall cover all such modifications and applications as do not depart from the true spirit and scope of the invention.

What is claimed is:

1. An apparatus for determining a parameter of operation of an energy management system of the type which controllably drops load from an electrical power network in response to preselected conditions, comprising:
    means for periodically interrupting the operation of said energy management system and restoring said load to said network;
    means for generating a first energy usage signal representative of energy usage on said network at a time when said energy management is not interrupted by said interrupting means;
    means for generating a second energy usage signal representative of energy usage on said network at a time when said interrupting means interrupts said energy management system; and
    means responsive to said first energy usage signal and said second energy usage signal for computing said parameter of operation of said energy management system.

2. An apparatus according to claim 1 including a signal conditioning circuit receiving a train of controlled pulses from a utility demand meter indicating electrical energy is being demanded.

3. An apparatus according to claim 1, wherein said computing means comprises a microprocessor, and further comprising means for generating a proper operation signal whenever the microprocessor is operating properly, and a proper operation watchdog means responsive to said proper operation signal for producing a reset signal which resets the microprocessor in response to failure to receive said proper operation signal.

4. An apparatus according to claim 1 including means for automatically printing energy usage and energy savings information on a periodic basis.

5. An apparatus according to claim 1 including means for automatically printing an energy usage and energy savings summary on a monthly basis.

6. An apparatus according to claim 1 including test means for providing immediate information on system operation and energy savings.

7. An apparatus according to claim 1 including means for remotely accessing energy usage and savings information via a telephone modem interface.

8. An apparatus according to claim 7 including means for preventing unauthorized telephone access.

9. An apparatus according to claim 1 including means for determining the peak kilowatt demand for loads connected to said network.

10. An apparatus according to claim 1, including means for determining the peak kilowatt demand for loads connected to said network.

11. An apparatus according to claim 1, wherein said parameter of operation is an energy demand parameter, and further including means responsive to said energy demand parameter for preventing a new peak resultant from loads restored to said network by disabling said interrupting means.

12. An apparatus according to claim 1 including means for establishing a target energy demand level above which said interrupting means does not interrupt the energy management system and restore full load.

13. An apparatus according to claim 12 wherein the target energy demand level is selectively variable within preselected limits.

14. The apparatus of claim 1, wherein said parameter of operation is energy savings realized by use of said energy management system.

15. An apparatus for determining a parameter of operation of an energy management system connected to an electrical power network, comprising:
  load control means operatively associated with said energy management system for selectively adding or dropping electrical load from said network in response to a predetermined condition;
  interrupting means for controllably interrupting said load control means and for restoring full electrical load, said interrupting means generating a first signal representative of energy usage when said load control means is interrupted and generating a second signal representative of energy usage when said load control means is not interrupted;
  computing means responsive to said first and second signals for computing said parameter of operation; and
  peak demand control means operatively associated with said energy management system for preventing establishment of a new peak demand level by disabling operation of said interrupting means in response to demand exceeding a preselected peak level.

16. The apparatus of claim 15, wherein said parameter of operation is energy savings realized by use of said energy management system.

17. A method for determining energy saved by an energy management system which controllably drops load from an electrical power network under predetermined conditions, comprising the steps of:
  periodically interrupting the energy management system and allowing reconnection of loads to said network;
  generating a signal representative of energy usage at a first time when the energy management system is not interrupted;
  generating a signal representative of energy usage at a second time when the energy management system is interrupted;
  receiving the signals representative of energy usage and determining a difference in energy usage at said first time and said second time; and
  applying an energy rate to the difference in order to determine energy saved.

18. A method according to claim 17 wherein the step of periodically interrupting the energy management system includes restoring full load.

19. A method according to claim 18 including determining the peak kilowatt usage.

20. A method according to claim 19 including determining the kilowatt-hours used.

21. A method according to claim 17, further comprising the steps of:
  setting a "not to exceed" peak demand level;
  monitoring the demand of loads connected to said network;
  preventing a new peak demand by not carrying out the interrupting step in response to the monitored demand exceeding the "not to exceed" level.

22. An apparatus for monitoring an energy management system of the type which controllably drops load in response to preselected conditions, comprising:
  means for periodically interrupting the energy management system and restoring load;
  means for generating a signal representative of energy usage at a time when the energy management system is not interrupted by the interrupting means;
  means for generating a signal representative of energy usage at a time when the interrupting means interrupts the energy management system;
  means responsive to the signals representing energy usage for computing energy savings; and
  means for establishing a target energy demand level above which said interrupting means does not interrupt the energy management system and restore full load.

23. An apparatus according to claim 22 wherein the target energy demand level is selectively variable within preselected limits.

* * * * *